United States Patent
Usami (10) Patent No.: US 8,031,255 B2
(45) Date of Patent: Oct. 4, 2011

(54) IMAGE CAPTURING DEVICE WITH FIELD LIMITING PARTS AND METHOD OF CAPTURING AN IMAGE USING FIELD LIMITING PARTS

(75) Inventor: Yoshihisa Usami, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 911 days.

(21) Appl. No.: 11/970,664

(22) Filed: Jan. 8, 2008

(65) Prior Publication Data

US 2008/0212147 A1 Sep. 4, 2008

(30) Foreign Application Priority Data

Jan. 9, 2007 (JP) ................................ 2007-001429

(51) Int. Cl.
*H04N 5/225* (2006.01)
(52) U.S. Cl. ........................................ 348/340; 348/294
(58) Field of Classification Search .................. 348/340, 348/343, 344, 294
See application file for complete search history.

(56) References Cited

U.S. PATENT DOCUMENTS

| | | | |
|---|---|---|---|
| 5,945,670 A | 8/1999 | Rudeen | |
| 6,297,904 B1 | 10/2001 | Kitagawa et al. | |
| 6,320,185 B1 | 11/2001 | Matsuo | |
| 6,330,082 B1 * | 12/2001 | Oliver | 358/473 |
| 6,791,686 B1 | 9/2004 | Finarov | |
| 6,917,385 B1 * | 7/2005 | Narabu | 348/340 |
| 7,098,945 B1 | 8/2006 | Sasai et al. | |
| 2002/0191092 A1 * | 12/2002 | Hayashi et al. | 348/294 |
| 2003/0025790 A1 * | 2/2003 | Smith | 348/143 |
| 2004/0032650 A1 | 2/2004 | Lauer | |
| 2004/0119835 A1 | 6/2004 | Okamura | |
| 2004/0233277 A1 * | 11/2004 | Miller et al. | 348/148 |
| 2006/0033831 A1 | 2/2006 | Ejima et al. | |

FOREIGN PATENT DOCUMENTS

| | | |
|---|---|---|
| EP | 1 601 191 A2 | 11/2005 |
| JP | 60-035517 | 2/1985 |
| JP | 2002-97447 | 7/2002 |
| JP | 2006295949 A | 10/2006 |
| WO | 2004/017627 A1 | 2/2004 |
| WO | 2006/127971 A2 | 11/2006 |

* cited by examiner

*Primary Examiner* — Gevell Selby
(74) *Attorney, Agent, or Firm* — Sughrue Mion, PLLC (57) ABSTRACT

An image capturing device includes: at least two field limiting parts which limit a field of view to a dot-like section to define a passage of light; a light sensor which detects light passing through the field limiting parts; a scanning device which moves a scanning spot defined by the dot-like section in two-dimensional directions within a scanning area of an image to be captured; and a control device which controls movements of the scanning spot by the scanning device while receiving detection signals from the light sensor.

17 Claims, 6 Drawing Sheets

FIG. 6B

IMAGE CAPTURING DEVICE WITH FIELD LIMITING PARTS AND METHOD OF CAPTURING AN IMAGE USING FIELD LIMITING PARTS

CROSS REFERENCE TO RELATED APPLICATIONS

This application claims the foreign priority benefit under Title 35, U.S. Code, §119(a)-(d) of Japanese Patent Application No. 2007-001429 filed on Jan. 9, 2007 in the Japan Patent Office, the disclosure of which is herein incorporated by reference in its entirety.

FIELD OF THE INVENTION

The present invention relates to an image capturing device and a method of capturing an image.

BACKGROUND OF THE INVENTION

As disclosed in Japanese Laid-open Patent Application No. 2006-295949, generally, when taking a picture with a digital camera, a scene is focused through a lens on two-dimensional image sensors such as CCD image sensors or CMOS image sensors, where an image of the scene is obtained as electronic data.

However, an optical lens inevitably causes optical aberration or distortion, and insufficient light intensity at peripheral vision. In order to obtain a better image, it is necessary to combine a plurality of lenses, which will result in a large-sized device.

Further, in order to achieve a zoom function using optical system, it is necessary to combine a plurality of lenses and to mechanically move the lenses along the optical axis, which will also result in a large-sized device.

In view of the above, the present invention seeks to provide a high-performance image capturing device and a method of capturing an image, which can realize simple and high-performance image capture.

SUMMARY OF THE INVENTION

According to one aspect of the present invention, there is provided an image capturing device, which comprises: at least two field limiting parts which limit a field of view to a dot-like section to define a passage of light; a light sensor which detects light passing through the field limiting parts; a scanning device which moves a scanning spot defined by the dot-like section in two-dimensional directions within a scanning area of an image to be captured; and a control device which controls movements of the scanning spot by the scanning device while receiving detection signals from the light sensor.

With this construction of the image capturing device, light passes through the field of view that has been limited to a dot-like section by the field limiting parts and goes into the light sensor, so that the light sensor detects the light intensity of one scanning spot. The image capturing device operates such that the scanning device moves the scanning spot in two-dimensional directions while the light sensor detects light, thereby capturing two-dimensional image data.

In the aforementioned image capturing device, the control device may correct exposure time or gain of the light sensor in accordance with a position of the scanning spot, so as to equalize an exposure level at all positions of the scanning spot. Alternatively, the control device may correct gain of the light sensor in accordance with movement speed of the scanning spot at each position of the scanning spot, so as to equalize an exposure level at all positions of the scanning spot.

With this construction of the image capturing device, even in the case where the light intensity detected by the light sensor contains an error in accordance with a position of the scanning spot, it is possible to equalize the exposure level at all positions of the scanning spot by adjusting the exposure time or by adjusting the gain of the light sensor.

In the aforementioned image capturing device, the scanning device may be a galvanometer mirror which is rotatable around two axes.

Further, in the aforementioned image capturing device, the light sensor may include a plurality of color filters for dividing light, and light detection elements each corresponding to the color filters. This construction of the image capturing device makes it possible to acquire color image information, for example, divided by three primary colors including R, G, and B.

In the aforementioned image capturing device, the field limiting parts may be variously modified. For example, the field limiting parts may be through holes formed in wall members, or openings formed at both ends of a tubular member having a predetermined length. One of the field limiting parts may be a part which defines a light receiving range of the light sensor, or it may be defined by an outer shape of a mirror which reflects light to the light sensor.

In the aforementioned image capturing device, the two field limiting parts may be stationary, and the scanning device may guide light to the two field limiting parts. Further, one of the two field limiting parts may function as the scanning device. Also, the two field limiting parts may be synchronously movable and function as the scanning device.

According to a second aspect of the present invention, there is provided a method of capturing an image by detecting light intensity at a plurality of scanning spots, while moving a scanning spot in two-dimensional directions. The method comprises: a field-limiting step for limiting a field of view to a dot-like section using at least two field limiting parts; a sensing step for sensing light that has passed through the two field limiting parts using a light sensor; and a controlling step for controlling movements of the scanning spot in the two-dimensional directions while receiving signals from the light sensor.

According to this method, light is thrown from the field of view that has been limited to a dot-like section by the field limiting parts and goes into the light sensor, so that the light sensor detects the light intensity of one scanning spot. Further, the light sensor detects light from the field of view while moving the field of view in two-dimensional directions, thereby capturing a two-dimensional image data.

The aforementioned image capturing method may further comprises a light-guiding step for guiding light from the field of view to the two field limiting parts by changing an angle of a mirror, and the two field limiting parts may be stationary. Further, in the aforementioned image capturing method, one of the two field limiting parts may function to move the scanning spot in the two-dimensional directions. Also, the two field limiting parts may be synchronously movable so as to move the scanning spot in the two-dimensional directions.

According to the present invention, in the aforementioned image capturing device and the aforementioned image capturing method, at least two field limiting parts limit the field of view and the light sensor detects the light intensity of one scanning spot. Therefore, it is not necessary to provide a lens, and this results in a simple structure of the image capturing device as well as obtaining better images without optical aberration or distortion.

BRIEF DESCRIPTION OF THE DRAWINGS

Other objects and aspects of the present invention will become more apparent by describing in detail illustrative, non-limiting embodiments thereof with reference to the accompanying drawings, in which.

DETAILED DESCRIPTION OF THE INVENTION

With reference to the accompanying drawings, image capturing devices and methods of capturing an image according to the present invention will be described below.

First Embodiment

Figure 1:
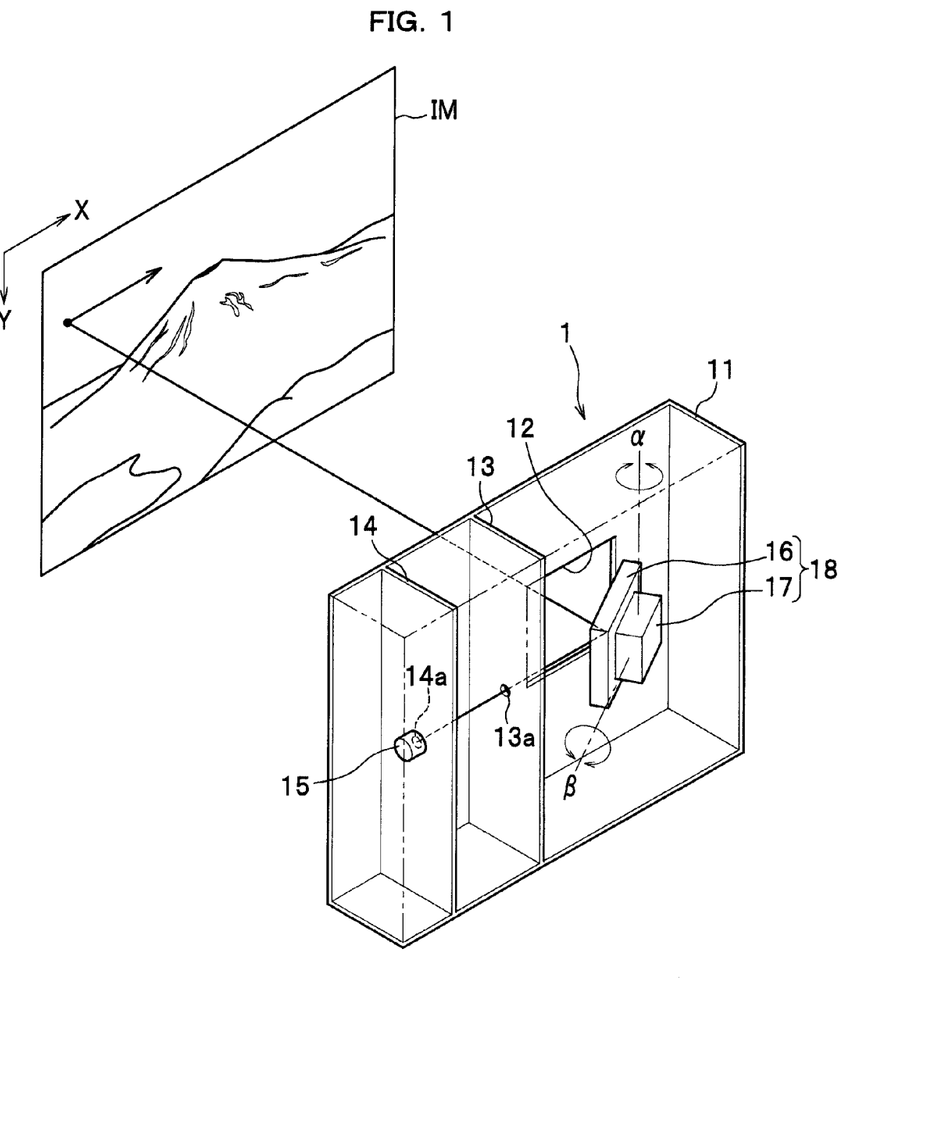
FIG. 1 is a perspective view illustrating the structure of an image capturing device according to a first embodiment of the present invention.

As seen in FIG. 1, an image capturing device 1 scans and captures an image IM as electronic data.

Figure 2:
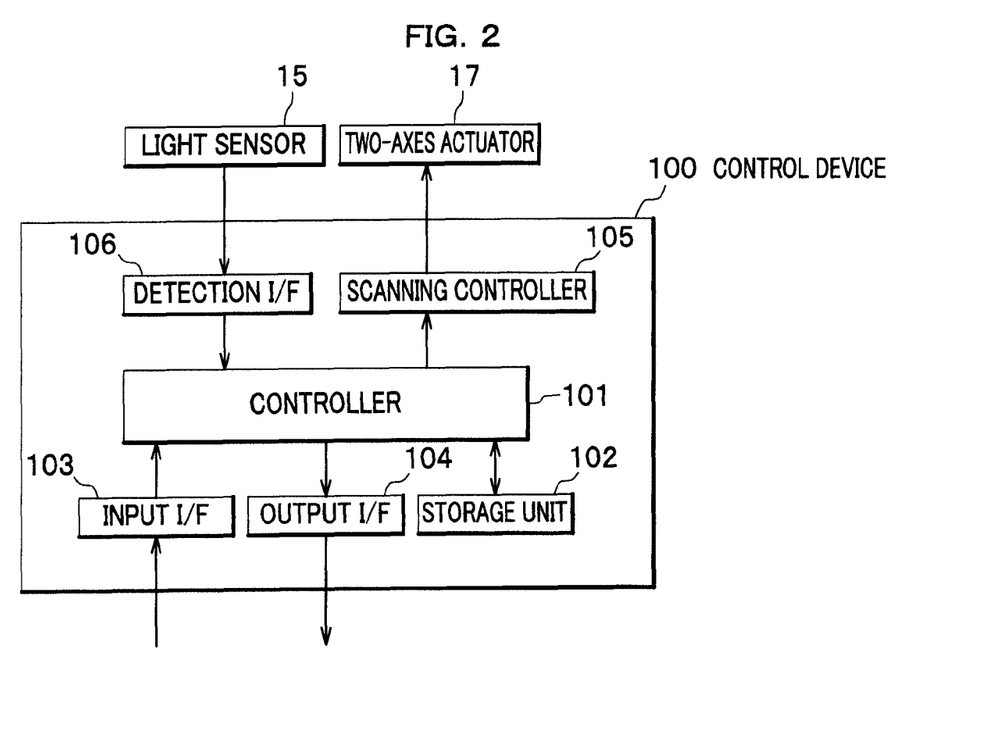
FIG. 2 is a block diagram of the image capturing device shown in FIG. 1.

The image capturing device 1 includes a casing 11, a galvanometer mirror 18, and a light sensor 15. The galvanometer mirror 18 is controlled by a control device 100 as shown in FIG. 2.

The casing 11 is provided with a window 12 for obtaining light at a surface facing to the image IM. The galvanometer mirror 18 is arranged in the casing 11 opposite to the window 12. The casing 11 is divided by partition walls 13, 14 into three rooms. Each partition wall 13, 14 has a dot-like opening 13a,14a, which allows a part of light reflected by the galvanometer mirror 18 to be passed through. The light sensor 15 is arranged at the opening 14a of the partition wall 14 so as to detect light that has passed through the opening 14a. In other words, the openings 13a, 14a limit a field of view to a dot-like section to define a passage of light. These openings 13a, 14a are field limiting parts, and the partition walls 13, 14 function as a field limiting member.

As with the conventional cameras, it is preferable that light absorption coating is applied to the inner wall surfaces of the casing 11 and other members within the casing 11 or that light absorption members are provided on the inner wall surfaces and/or members within the casing 11.

The galvanometer mirror 18 includes a mirror 16, and a two-axes actuator 17 as a scanning device, which rotates the mirror 16 around two axes, i.e., α-axis (vertical axis) and β-axis (horizontal axis) of the galvanometer mirror 18, so as to change the angle of the mirror 16. The galvanometer mirror 18 reflects light from a scanning spot defined by the dot-like section to the light sensor 15. The galvanometer mirror 18 moves the scanning spot within the scanning area of the image IM to be captured by changing the angle of the mirror 16 using the two-axes actuator 17, so that the image IM can be scanned along the two-dimensional directions including the X-axis direction (horizontal direction) and the Y-axis direction (vertical direction) of the image IM.

The galvanometer mirror 18 may be of any known types. However, as preferred embodiments, a galvanometer mirror 50 as shown in FIG. 3A and a galvanometer mirror 60 as shown in FIG. 3B may be employed.

Figure 3A:
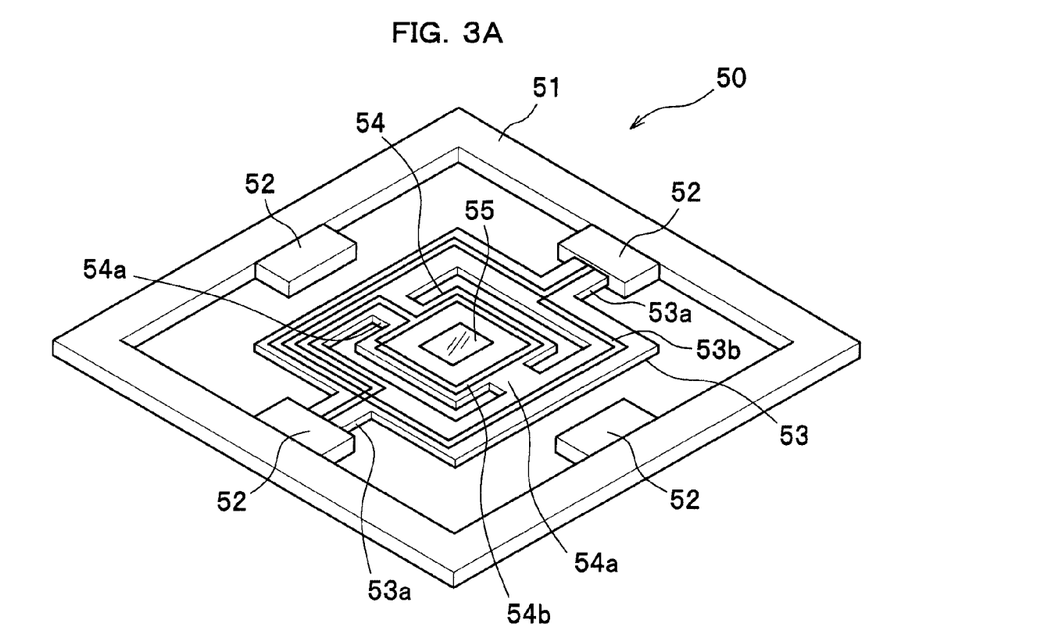
FIG. 3A is a perspective view illustrating one example of a galvanometer mirror.

The galvanometer mirror 50 shown in FIG. 3A is a micro machine made of a Si substrate that has been processed by photo lithography. The galvanometer includes a rectangular-shaped yoke 51, and magnets 52 each provided at the inner sides of the yoke 51. Extending inwardly from the substrate (not shown) at positions corresponding to one pair of inner sides of the rectangular yoke 51 are torsion springs 53a, 53a, and a first coil arrangement portion 53 in the form of a rectangular loop is provided via the torsion springs 53a, 53a. A first coil 53b is provided on the first coil arrangement portion 53. At the other sides of the first coil arrangement portion 53 which are positioned 90 degrees away from the pair of sides where the torsion springs 53a, 53a are provided, a second coil arrangement portion 54 extends inward via torsion springs 54a, 54a. The second coil arrangement portion 54 has a rectangular shape, and a mirror 55 is formed in the center by vapor deposition, etc. A second coil 54b is provided around the mirror 55. According to this structure of the galvanometer mirror 50, when applying an electric current to the first coil 53b and the second coil 54b, a magnetic field is generated so that the second coil arrangement portion 54 on which the mirror 55 is arranged is twisted and the angle of the mirror 55 is changed.

Figure 3B:
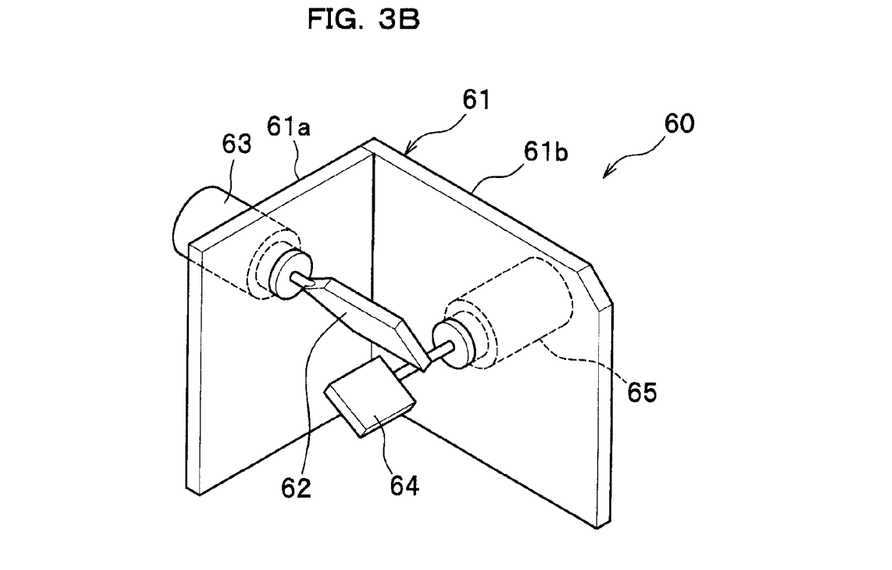
FIG. 3B is a perspective view illustrating another example of the galvanometer mirror.

According to another example of the galvanometer mirror 60 as shown in FIG. 3B, a metal fitting 61 has an L-shaped configuration including a pair of plate members 61a, 61b. A servo motor 63 to which a mirror 62 is attached is fixed to one plate member 61a, and a servo motor 65 to which a mirror 64 is attached is fixed to the other plate member 61b. When a control signal is transmitted to the servo motors 63, 65, the servo motors 63, 65 rotate the mirrors 62, 64, respectively to a desired angle, thereby scanning the image IM (see FIG. 1) in the two-dimensional directions.

In this preferred embodiment, the image IM is shown as a planer image for the purpose of easy understanding. However, the image IM is not limited to such a planer image, and it may be an object or scenery in the external world. Further, as described later, the image IM may be optically recorded data on a recording medium.

The light sensor 15 is a sensor for measuring the light intensity of light that has passed through the opening 14a of the partition wall 14. The light sensor 15 is not limited to a two-dimensional image sensor such as a CCD, and for instance, a photodiode may be used as the light sensor 15.

As seen in FIG. 2, the control device 100 is a computer including a CPU, a ROM, a RAM, etc. The control device 100 includes a controller 101, a storage unit 102, an input I/F (interface) 103, an output I/F (interface) 104, a scanning controller 105 which actuates the two-axes actuator 17 for the galvanometer mirror 18, a detection I/F (interface) 106 to which the light intensity measured by the light sensor 15 is input, etc.

The scanning controller 105 is a known galvanometer mirror controller. When the rotation angles of the mirror 16 around the α-axis and the β-axis of the galvanometer mirror 18 are input from the controller 101, the scanning controller 105 actuates servo motors (not shown) in the two-axes actuator 17 to change the angle of the mirror 16.

The controller 101 outputs the angles around the α-axis and the β-axis of the galvanometer mirror 18 to the scanning controller 105, while receiving the light intensity measured by the light sensor 15 through the detection I/F 106 and storing the same in the storage unit 104. During this process, the controller 101 calculates the coordinate of the scanning spot in the X-axis direction of the image IM based on the angle around the α-axis of the galvanometer mirror 18 as well as the coordinate of the scanning spot in the Y-axis direction of the image IM based on the angle around the β-axis of the galvanometer mirror 18, and digitalizes and stores the light intensity at this specific scanning spot in accordance with this calculated coordinate (x, y).

A light source may be provided where necessary in order to irradiate light to the image IM.

According to the image capturing device 1 as described above, the angle of the galvanometer mirror 18 is specified, and light that is scattered or reflected at a specific point on the image IM is guided to pass through the openings 13a, 14a as the field limiting parts and to reach the light sensor 15, so that the light sensor 15 can measure the light intensity, that is, the brightness at the specific point. Further, instead of obtaining angles of the galvanometer mirror 18 around the α-axis and the β-axis thereof, the coordinate of the scanning spot can be sequentially obtained along the X-axis and Y-axis directions of the image IM (see FIG. 1) while moving (scanning) the scanning spot within the scanning area of the image IM to be captured. Therefore, it is possible to obtain the whole image IM in relation to the coordinates and brightness of the all scanning spots within the scanning area.

Further, if the scanning area of the image IM is narrowed to a specific area, it is possible to obtain an enlarged image with this specific area being zoomed up. On the contrary, if the scanning area of the image IM is extended to a certain extent, it is possible to obtain a wide angled image IM.

As described above, since the image capturing device 1 does not employs an optical lens, the obtained image data is free of aberration or distortion which inevitably causes in the optical lens, thereby resulting in a better image. Further, as described above, changing the scanning area of the image IM realizes the zoom function of the optical lens, thereby leading to reduced size of the image capturing device.

Second Embodiment

Figure 4A:
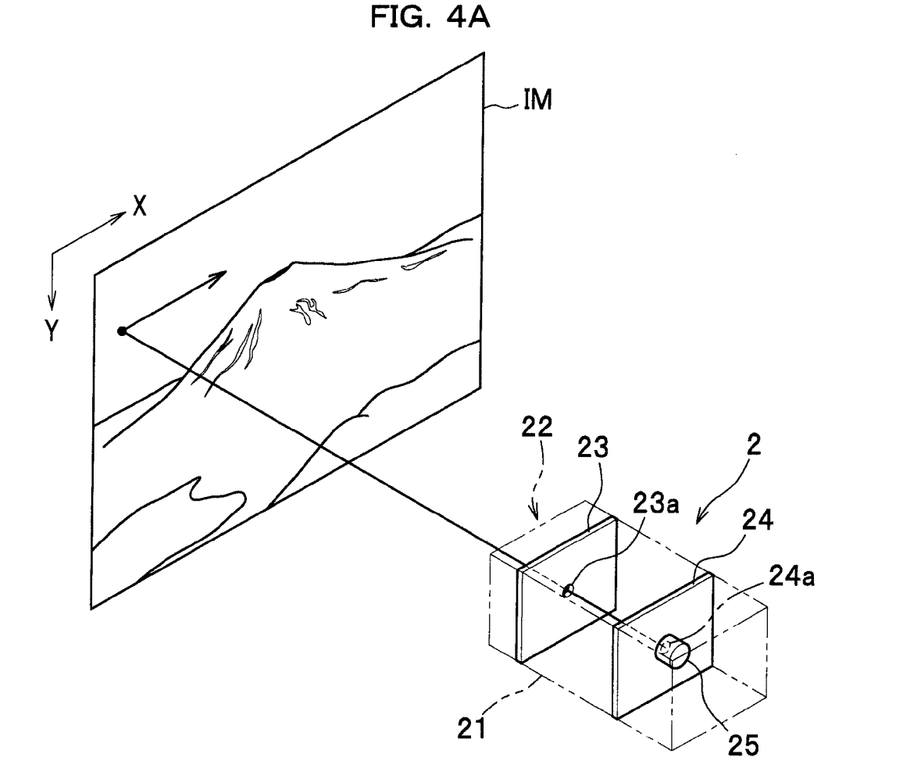
FIG. 4A is a perspective view illustrating the structure of an image capturing device according to a second embodiment of the present invention.
Figure 4B:
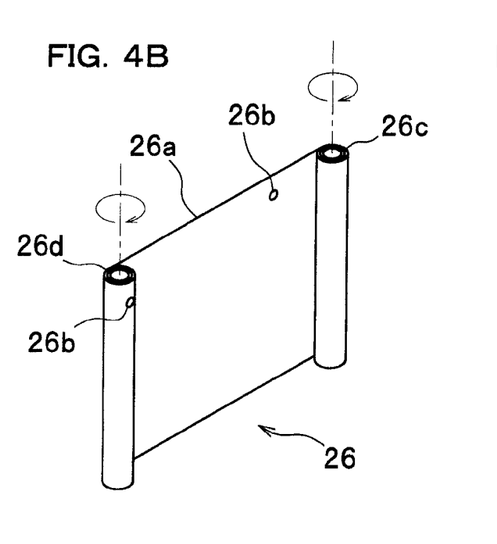
FIG. 4B is a perspective view illustrating a first example of a scanning device.
Figure 4C:
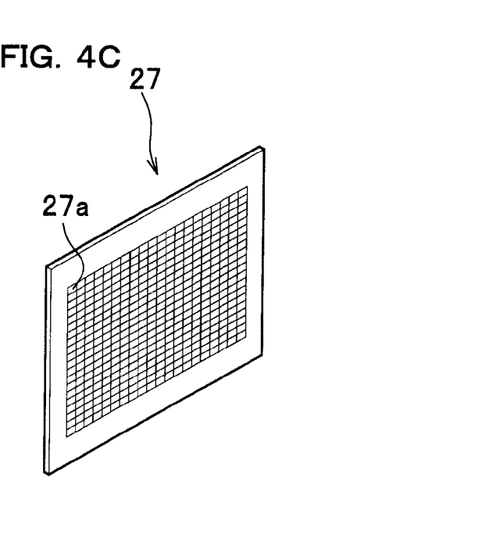
FIG. 4C is a perspective view illustrating a second example of the scanning device.

With reference to FIGS. 4A to 4C, an image capturing device according to a second embodiment will be described below. In the following description, parts similar to those previously described with reference to the first embodiment are denoted by the same reference numerals, and detailed description thereof will be omitted.

As seen in FIG. 4A, an image capturing device 2 includes a casing 21, and a window 22 is formed in the casing 21 at a surface facing to an image IM. The casing 11 is partitioned by a field limiting wall 23 and a partition wall 24. The field limiting wall 23 forms an opening 23a as the field limiting part by which the image IM can be scanned along the X-axis direction and the Y-axis direction of the image IM to be captured. The partition wall 24 also forms an opening 24a as the field limiting part. A light sensor 25 is provided at the opening 24a of the partition wall 24.

As long as it can scan the image IM with the opening 23a along the X-axis and Y-axis directions of the scanning area of the image IM to be captured, the field limiting wall 23 is not limited to have a specific structure. For example, the field limiting wall 23 may be formed as a movable screen 26 as illustrated in FIG. 4B. The movable screen 26 as a first example of a scanning device includes an elongated screen 26a both ends of which are rolled up as rolls 26c, 26d. In order to limit a field of view to a dot-like section to define a passage of light, small holes or openings 26b are formed in the movable screen 26 at an equally spaced interval along the longitudinal direction (X-axis direction) of the movable screen 26. Further, adjacent holes 26b, 26b are slightly offset to each other in the vertical direction (Y-axis direction). Accordingly, when the movable screen 26 is rolled up, for example, from the roll 26d to the roll 26c, the position of the small hole 26b changes along the X-axis direction as well as along the Y-axis direction. This makes it possible to scan the image IM along the X-axis and Y-axis directions.

According to a second example of the scanning device, the field limiting wall 23 is formed as a liquid crystal panel 27 as illustrated in FIG. 4C. The liquid crystal panel 27 is provided with a plurality of pixels which can be controlled to be transparent one at a time, so that one transparent pixel moves on the liquid crystal panel 27 along the X-axis and Y-axis directions, thereby realizing scanning through the transparent pixel.

As with the first embodiment, a control device (not shown) controls a scanning operation of the movable screen 26 and the liquid crystal panel 27.

According to the second embodiment, unlike the first embodiment in which the angle of the mirror 16 is changed to scan the image IM while stationarily retaining the two field limiting parts, the image IM is scanned by offsetting the opening or pixel of the field limiting part in two-dimensional directions within the scanning area of the image IM to be captured. In other words, one of the two field limiting parts functions as the scanning device. The image capturing device 2 according to the second embodiment can also acquire electric data of the image IM as with the fist embodiment.

Third Embodiment

Figure 5:
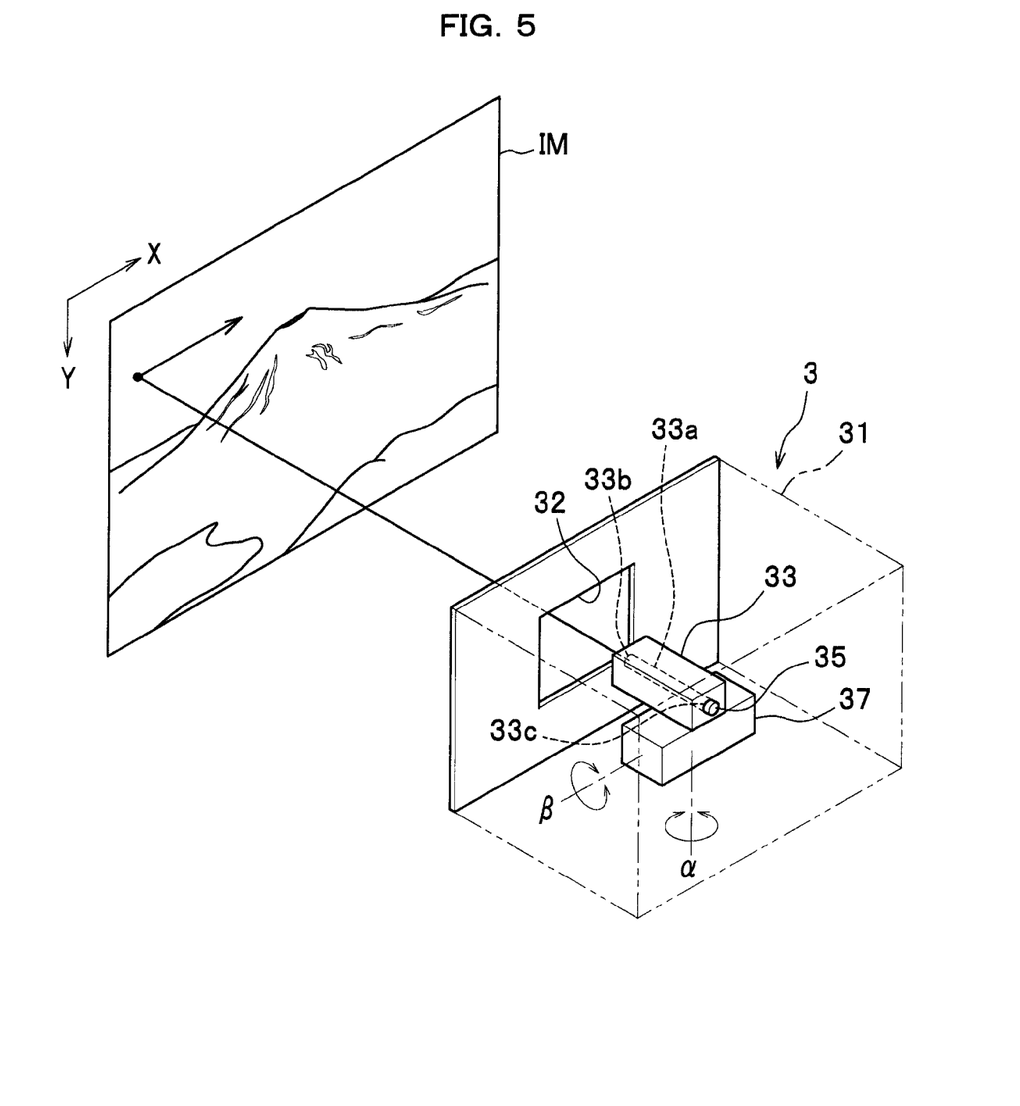
FIG. 5 is a perspective view illustrating the structure of an image capturing device according to a third embodiment of the present invention.

With reference to FIG. 5, an image capturing device according to a third embodiment will be described below. In the following description, parts similar to those previously described with reference to the first embodiment are denoted by the same reference numerals, and detailed description thereof will be omitted.

As seen in FIG. 5, an image capturing device 3 includes a casing 31, a field limiting block 33 as a field limiting member which is positioned in the casing 31, a light sensor 35, a two-axes actuator 37, and a control device (not shown) which is similar to that of the first embodiment.

The casing 31 is provided with a window 32 at a surface facing to the image IM, and the field limiting block 33 is arranged in the casing 31 opposite to the window 32.

The field limiting block 33 is an elongate member whose longitudinal axis extends in the direction toward the image IM, and an elongated through-hole 33a is formed along the longitudinal direction of the field limiting block 33. The diameter and the length of the through-hole 33a are determined to have a sufficient relative rate for limiting the field of view to a dot-like section which defines a scanning spot. One end opening 33b of the through-hole 33a faces to the image IM, and the light sensor 35 is positioned behind the other end opening 33c. In other words, the field limiting block 33 functions as a tubular member for limiting the field of view to a dot-like section and having a predetermined length, and both end openings 33b, 33c of the tubular member correspond to the field limiting parts.

With this construction of the image capturing device 3, when the two-axes actuator operates to move the direction of the through-hole 33a in the X-axis and Y-axis directions within the scanning area of the image IM, the image IM can be scanned through a scanning spot defined by the dot-like section and the light intensity (i.e., brightness) of each scanning spot is obtained, thereby capturing the image IM. According to the third embodiment, the two field limiting parts are synchronously movable and function as the scanning device.

Fourth Embodiment

Figure 6A:
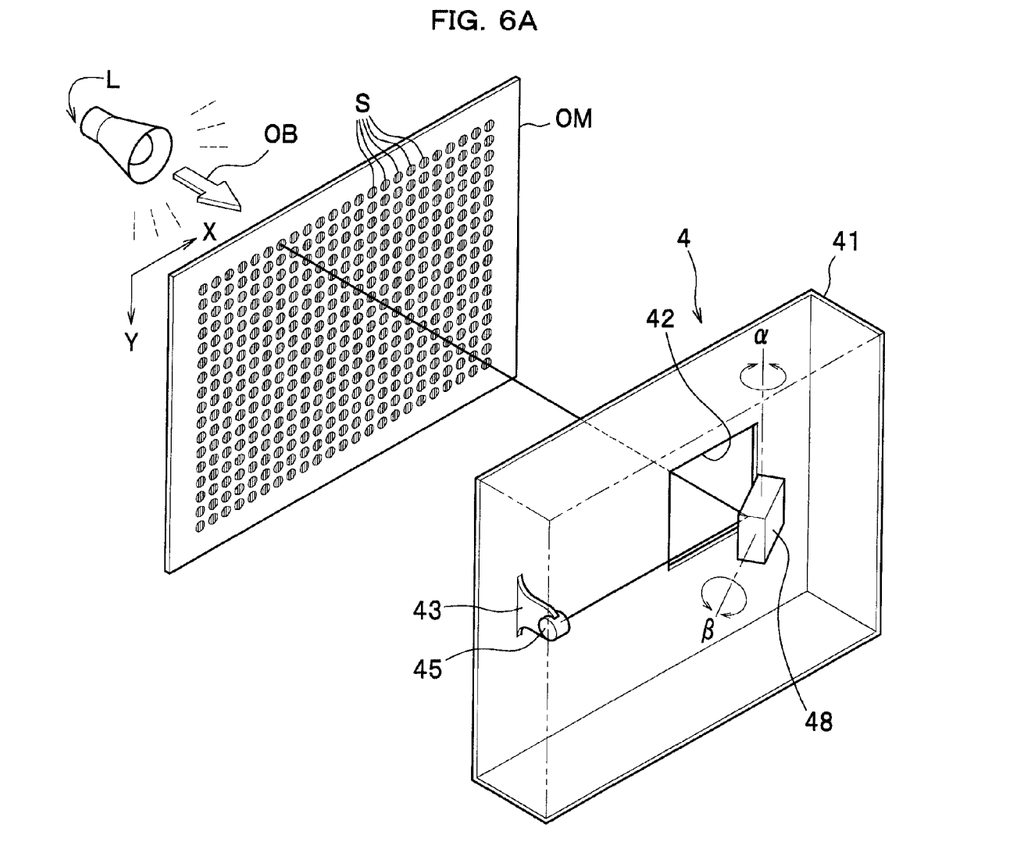
FIG. 6A is a perspective view illustrating the structure of an image capturing device according to a fourth embodiment of the present invention.
Figure 6B:
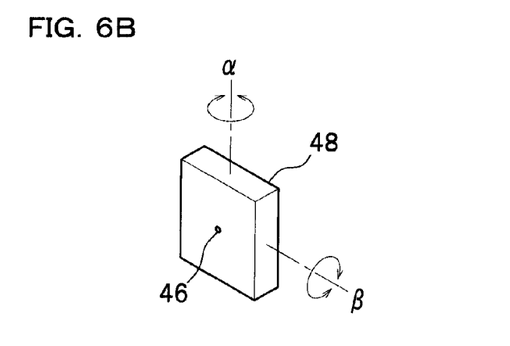
FIG. 6B is a perspective view illustrating the front surface side of a two-axes actuator.

With reference to FIGS. 6A and 6B, an image capturing device according to a fourth embodiment will be described. In the following description, parts similar to those previously described with reference to the first embodiment are denoted by the same reference numerals, and detailed description thereof will be omitted.

As seen in FIG. 6A, an image capturing device 4 reads an optical recording medium OM as an image to be captured. The optical recording medium OM is a card-type recording medium in which pixel-like recording spots S are formed and aligned in the X-axis and Y-axis directions. Each recording spot S is a spot of an interference pattern in which data have been recorded by a known holographic recording method. To be more specific, mutually coherent information light (image information) and reference light are irradiated onto the same spot on the optical recording medium OM to form an interference pattern, and the resulting interference pattern is recorded.

When a reading light OB having the same wavelength and the same angle with the reference light is irradiated from a light source L in the opposite direction of the image capturing device 4, the optical recording medium OM emits from the recording spots S and reconstructs the same information light (image information).

The image capturing device 4 includes a casing 41, and a two-axes actuator 48 and a light sensor 45 are provided in the casing 41.

The casing 41 is provided with a window 42 at a side facing to the optical recording medium OM, and the two-axes actuator 48 is arranged in the casing opposite to the window 42.

As shown in FIG. 6B, an extremely small mirror 46 is attached to the two-axes actuator 48 on the front surface, i.e., on the side of the window 42 of the two axes actuator 48. The mirror 46 limits the field of view to a dot-like section, and the outer shape of the mirror 46 functions as a field limiting part. The angle of the two-axes actuator 48 is changed and controlled by the same control device according to the first embodiment.

A support member 43 is provided in the casing 41 extending from the inner wall of the casing 41. The light sensor 45 is fixed to the support member 43 to such a position that light reflected by the mirror 46 goes into the light sensor 45. The light acquisition area of the light sensor 45 is defined by the outer shape of the outer sheath member of the light sensor 45 or the outer shape of the photodiode so that the outer shape thereof functions as a field limiting part.

According to the image capturing device 4, the mirror 46 and the light sensor 45 function to limit the field of view to a dot-like section. Therefore, the image capturing device 4 does not require separate field limiting parts. The image capturing device 4 can obtain the image information upon reading the optical recording medium OM by changing the angle of the two-axes actuator 48 along the α-axis and the β-axis of the two-axes actuator 48 so as to scan the scanning spot along the X-axis and the Y-axis directions within the scanning area of the optical recording medium OM in accordance with the recording spots S of the optical recording medium OM. In other words, the information recorded on the optical recording medium OM is read out by the image capturing device 4.

According to the image capturing device 4 as shown in FIG. 6A, a partition wall is not provided to partition the space in which the light sensor 45 is arranged from the space in which the two-axes actuator 48 is arranged. However, of course such a partition wall may be provided, and an opening is formed in the partition wall so as to guide light from the mirror 46 to the light sensor 45. This is advantageous because the light sensor 45 does not detect unnecessary scattered light.

As described above, reducing the size of the mirror 46 or reducing the size of the member for defining the light acquisition area of the light sensor 45 can provide a field limiting part. Further, reducing the size of the mirror 46 contributes to downsize the whole image capturing device.

Although the present invention has been described in detail with reference to the above preferred embodiments, the present invention is not limited to these specific embodiments and various changes and modifications may be made without departing from the scope of the appended claims.

The above embodiments refer to capturing a monochrome image. However, the present invention is applicable to capturing a color image. In this instance, for example, the light sensor 15 may be provided by three adjacent photodiodes, each of which has a color filter corresponding to R, G, and B, respectively. This image capturing device can acquire the light intensity, i.e., brightness of three primary colors including R, G, and B. In other words, the image capturing device can acquire color image information.

Further, in addition to receiving and storing the light intensity from the light sensor 15, the controller 101 may apply an amendment to the light intensity from the light sensor 15 in accordance with a position of the scanning spot.

For example, it is possible to adjust the obtained light intensity in accordance with reflectivity of the mirror 16 corresponding to the incident angle of the light. To be more specific, at an angle where the reflectivity is low, the scanning spot may be moved slowly to extend the exposure time or gain of the light sensor 15 may be increased. This can advantageously equalize the exposure level at all positions of the scanning spot within the scanning area of the image to be captured. For this purpose, it is preferable that an object having a constant gray color is captured with the image capturing device and that a correction level is set in advance for each scanning spot.

Alternatively, the controller 101 may adjust gain of the light sensor 15 in accordance with movement speed of the scanning spot, i.e., scanning speed. For example, in the case where the two-axes actuator 17 is controlled to move slowly at or around both ends of the scanning angle region of the two-axes actuator 17 (i.e., the two-axes actuator 17 is controlled to move slowly when the scanning spot moves at or around both ends of the scanning area of the image IM to be captured), the gain of the light sensor 15 may be decreased in accordance with the reduced scanning speed.

Further, upon realizing a zoom function by varying the scanning area of the image IM to be captured, it is possible to change the scanning pitch of the scanning spot in addition to change the scanning area.

If the image capturing device is moved due to camera shake or vibration during the scanning operation of the image IM to be captured, a blurry image may be obtained. In order to prevent blurring of the captured image, the image capturing device may be provided with an optical image stabilizer. The optical image stabilizer may be achieved, for example, by employing an acceleration sensor for measuring the movement of the camera shake and the like, and based on the detected result of the acceleration sensor calculating the angle of the detected light, followed by correcting the light acquisition timing for each coordinate.

What is claimed is:

1. An image capturing device comprising:
    at least two field limiting parts which limit light directed from a field of view to a pencil of light having a minute diameter;
    a light sensor which detects light passing through the field limiting parts;
    a scanning device which moves a scanning spot defined by the pencil of light in two-dimensional directions within a scanning area of an image to be captured; and
    a control device which controls movements of the scanning spot by the scanning device while receiving detection signals from the light sensor.

2. The image capturing device according to claim 1, wherein the control device corrects exposure time or gain of the light sensor in accordance with a position of the scanning spot, so as to equalize an exposure level at all positions of the scanning spot.

3. The image capturing device according to claim 1, wherein the control device corrects gain of the light sensor in accordance with movement speed of the scanning spot at each position of the scanning spot, so as to equalize an exposure level at all positions of the scanning spot.

4. The image capturing device according to claim 1, wherein the scanning device is a galvanometer mirror which is rotatable around two axes.

5. The image capturing device according to claim 1, wherein the light sensor includes a plurality of light detection elements, each of which has a color filter for dividing light.

6. The image capturing device according to claim 1, wherein the at least two field limiting parts are through holes formed in wall members.

7. The image capturing device according to claim 1, wherein a light acquisition area of the light sensor forms one of the field limiting parts.

8. The image capturing device according to claim 1, wherein the at least two field limiting parts are openings formed at both ends of a tubular member having a predetermined length.

9. The image capturing device according to claim 1, wherein one of the two field limiting parts is defined by an outer shape of a mirror which reflects light to the light sensor.

10. The image capturing device according to claim 1, wherein the two field limiting parts are stationary, and the scanning device guides light to the two field limiting parts.

11. The image capturing device according to claim 1, wherein one of the two field limiting parts functions as the scanning device.

12. The image capturing device according to claim 1, wherein the two field limiting parts are synchronously movable and function as the scanning device.

13. A method of capturing an image by detecting light intensity at a plurality of scanning spots, while moving a scanning spot in two-dimensional directions, the method comprising:
    a sensing step for limiting a field of view using at least two field limiting parts which limit light directed from the field of view to a pencil of light having a minute diameter and for sensing the light that has passed through the two field limiting parts using a light sensor; and
    a controlling step for controlling movements of the scanning spot in the two-dimensional directions while receiving signals from the light sensor.

14. The method according to claim 13, wherein in the controlling step, the movements of the scanning spot are carried out by changing an angle of a mirror.

15. The method according to claim 13, wherein one of the two field limiting parts functions to move the scanning spot in the two-dimensional directions.

16. The method according to claim 13, wherein the two field limiting parts are synchronously movable so as to move the scanning spot in the two-dimensional directions.

17. The image capturing device according to claim 7, wherein a partition wall is provided in a space between the light sensor and the scanning device, and an opening is formed in the partition wall.

* * * * *